(12) United States Patent
Breidenbach

(10) Patent No.: US 9,663,156 B2
(45) Date of Patent: May 30, 2017

(54) AERODYNAMIC DRAG REDUCING APPARATUS

(71) Applicant: Thomas Scott Breidenbach, Maple Grove, MN (US)

(72) Inventor: Thomas Scott Breidenbach, Maple Grove, MN (US)

(*) Notice: Subject to any disclaimer, the term of this patent is extended or adjusted under 35 U.S.C. 154(b) by 0 days.

(21) Appl. No.: 14/821,690

(22) Filed: Aug. 7, 2015

(65) Prior Publication Data

US 2016/0068201 A1  Mar. 10, 2016

Related U.S. Application Data

(60) Provisional application No. 62/034,156, filed on Aug. 7, 2014.

(51) Int. Cl.
*B62D 35/00* (2006.01)

(52) U.S. Cl.
CPC .......... *B62D 35/007* (2013.01); *B62D 35/001* (2013.01)

(58) Field of Classification Search
CPC ..... B62D 35/001; B62D 35/007; B62D 37/02
USPC .......................................... 296/180.4, 180.5
See application file for complete search history.

(56) References Cited

U.S. PATENT DOCUMENTS 7,845,708 B2 * 12/2010 Breidenbach .......... B62D 35/00
296/180.1

* cited by examiner

*Primary Examiner* — Jason S Daniels
(74) *Attorney, Agent, or Firm* — Thomas Scott Breidenbach

(57) ABSTRACT

An aerodynamic drag reducing device reduces drag on a vehicle when in an extended configuration. The aerodynamic drag reducing device includes a moveable frame, a set of linkages, and a linkage coordinator. The set of linkages supports the moveable frame in an extended configuration and a retracted configuration. A first linkage of the set of linkages defines a first axis, and a second linkage of the set of linkages defines a second axis. The linkage coordinator coordinates movement between the first linkage about the first axis and the second linkage about the second axis. The first and second axes may be non-parallel.

17 Claims, 9 Drawing Sheets

AERODYNAMIC DRAG REDUCING APPARATUS

CROSS-REFERENCE TO RELATED APPLICATION

This application claims the benefit of U.S. Provisional Patent Application Ser. No. 62/034,156, filed Aug. 7, 2014, which application is hereby incorporated by reference in its entirety.

BACKGROUND

It is known that a significant amount of aerodynamic drag is created when a vehicle travels at velocities typical on a modern roadway. This, in large part, is due to areas of low pressure that act on rear surfaces of the vehicle. The low pressure becomes more pronounced as airflow over the vehicle separates from surfaces of the vehicle. The phenomenon of airflow separation is also well known in aircraft wing design and, in this case, causes the aircraft wing to stall.

Vehicles with blunt rear ends are especially affected by airflow separation starting at an abrupt transition to the near vertical rear end surfaces. The low pressure that the airflow separation causes is compounded by a relatively large area that the low pressure acts over compared with more streamlined vehicles.

The low pressure acting on the rear surfaces of the vehicle as it moves produces a force that resists forward motion of the vehicle. The force is opposed by the vehicle's engine and requires power that is typically produced by burning fuel. Any reduction in aerodynamic drag results in a reduction in fuel consumption.

In a period of high fuel prices, increasing fuel efficiency is a growing concern. Aerodynamic improvements are especially valuable since they can be combined with other improvements such as engine efficiency, reduced chassis weight, etc. Increasing the fuel efficiency also provides a valuable benefit of increasing a range that a given vehicle can travel between refueling stops.

SUMMARY

One aspect of the present disclosure relates to an aerodynamic drag reducing apparatus adapted for mounting behind a vehicle. The apparatus includes a frame adapted to extend and retract behind a rear end of the vehicle. The frame is connected to the vehicle via a set of linkages. In certain embodiments, the linkages are attached to the vehicle at rear doors of the vehicle. The linkages may be coordinated with each other and thereby move the frame between a stowed configuration adjacent and/or near the vehicle and an extended configuration spaced away from the rear of the vehicle. In certain embodiments, the frame may substantially define a plane that remains substantially parallel to the rear end of the vehicle as the frame is moved between the extended and retracted configurations. The linkages may be mechanically connected to each other and thereby move in a coordinated manner as the frame is moved between the extended and the retracted configurations. In certain embodiments, a flexible material and/or fabric (e.g., a tarp material) may be attached to the rear end of the vehicle and attached to the frame. When in the retracted configuration, the flexible material may fold and be relatively compact behind the vehicle. The linkages may assist in the folding of the fabric. In certain embodiments, the frame pulls the flexible material tight when in the extended configuration and thereby produces tension within the flexible material. The tension in the flexible material may be maintained by the frame pulling outwardly in a rearward direction away from the vehicle while attached to the rear end of the flexible material, and the forward end of the flexible material may be held by a connection to a body of the vehicle. In embodiments with rear doors on the vehicle, the attachment of the flexible material to the rear of the vehicle may occur by attaching the flexible material to offsetting members attached to the rear door of the vehicle. The offsetting member may extend from a perimeter of the door and thereby attach to the flexible material nearer to a perimeter of the vehicle. By including the offsetting member, a step between the attached edge of the flexible material and a perimeter of the vehicle may be eliminated or reduced.

In certain embodiments, the linkages are included in a set of linkages. A pair or a plurality of the linkages or a single one of the linkages may be used to attach a side (i.e., a top) of the frame that corresponds with a top of the vehicle. Another pair or plurality or single one of the linkages may be attached to a side of the frame that corresponds with a side of the vehicle. Still another pair, plurality, or single one of the linkages may be attached to a side of the frame that corresponds with a bottom of the vehicle. In certain embodiments, the linkages may be the same as or similar to each other. The linkages may be mounted to the rear end of the vehicle (e.g., the doors of the vehicle) at mounting brackets. The mounting brackets may define pivot axes that may be substantially parallel to the rear end of the vehicle. In certain embodiments, the pivot axes of the upper pair of linkages may be substantially parallel to a top of the vehicle. In certain embodiments a pair of axes of the mounting brackets of the side pair of linkages may extend substantially parallel to a side of the vehicle. In certain embodiments, axes of mounting brackets for the lower pair of linkages may extend substantially parallel to the bottom of the vehicle. The linkages may include a first link rotatably mounted to the respective axes of the mounting brackets. The linkages may further include a second link pivotally connected to the first link. In certain embodiments, the pivotal connection between the first and second link may be a spherical pivotal connection. In other embodiments, the pivotal connection between the first and second links may be a cylindrical axis. The second link may be pivotally connected to the frame along an axes substantially parallel to the axis of the respective mounting bracket.

As the upper and/or the lower pair of linkages extend substantially in a horizontal direction, and axes of the side pair of linkages extend substantially in a vertical direction, the frame (e.g., a hoop) may be laterally supported by the upper and/or the lower linkages and may be vertically supported by the side pair of linkages.

The first support (e.g., a vertical support) may generally allow the frame to move in a first plane (e.g., a horizontal plane), and the second support (e.g., a lateral support) may generally allow the frame to move in a second plane (e.g., a vertical plane). By combining the first and second supports (e.g., the vertical support and the lateral support), the frame may be constrained to move substantially in a linear direction defined by the intersection of the first and second planes (e.g., the vertical plane and the horizontal plane).

As the frame extends and retracts, the center of gravity of the frame and the flexible material will move forwardly and rearwardly. In particular, as the frame is moved from the stowed configuration toward the extended configuration, the center of gravity will extend rearwardly away from the vehicle. The weight of the frame and the flexible material may cause the linkages to droop and thereby allow the frame to travel along a path that droops. To prevent the linkages from drooping, the linkages may be interconnected to each other and thereby maintain a desired orientation between the frame and the rear of the vehicle as the frame is extended from the stowed configuration to the extended configuration. In certain embodiments, the various links of the linkages may be interconnected by a shaft. As the upper and lower linkages have axes that extend in a generally horizontal direction, and as the side linkages have axes that extend generally in a vertical direction, the shafts interconnecting the corresponding links may include flexible joints (e.g., U-joints, constant velocity joints, flexible torsional members, etc.). In certain embodiments, linkages may coordinate rotational movement of corresponding links between the upper and/or the lower linkages and the side linkages.

BRIEF DESCRIPTION OF THE DRAWINGS

Non-limiting and non-exhaustive embodiments are described with reference to the following figures, which are not necessarily drawn to scale, wherein like reference numerals refer to like parts throughout the various views, unless otherwise specified.

DETAILED DESCRIPTION

Figure 1:
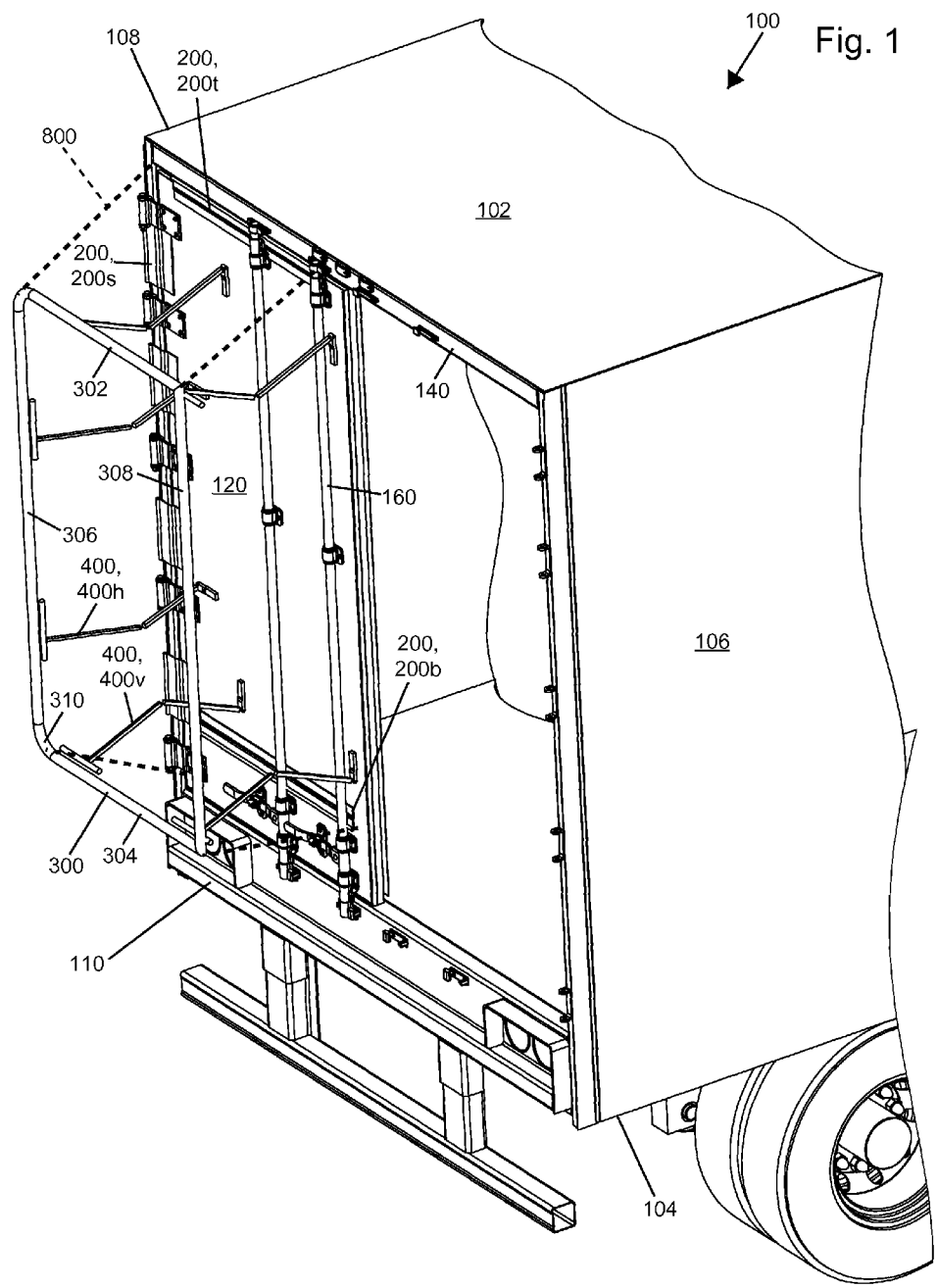
FIG. 1 is a partial semi-schematic perspective view of a vehicle with an aerodynamic drag reducing apparatus mounted on a rear end of the vehicle, the aerodynamic drag reducing apparatus illustrated in a deployed configuration, according to the principles of the present disclosure.

Various embodiments will be described in detail with reference to the drawings wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

This application relates to U.S. Pat. Nos. 7,380,868; 7,784,854; 8,622,461; 8,627,738; 7,845,708; and 8,708,398, which are all hereby incorporated by reference in their entireties.

The present disclosure generally relates to rear mounted aerodynamic devices for use with vehicles. In certain embodiments, the vehicles have a generally vertical rear end. The generally vertical rear end typically results in air flow separation and thereby produces aerodynamic drag, especially when the vehicle is traveling at highway speeds. As described in the aforementioned U.S. Patents, various linkages and frames may be used to support a flexible material 800 and pull the flexible material 800 tight (e.g., drum tight) and thereby form an aerodynamic shade behind the vehicle. According to the principles of the present disclosure, various refinements and improvements may be incorporated into aerodynamic apparatuses described and illustrated in the aforementioned U.S. Patents. In particular, various linkages of the aerodynamic drag reducing apparatus may be coordinated with each other. Certain linkages may include joints that are parallel with other linkages. In addition, certain linkages may include joints that are generally coaxial with joints of other linkages. In addition, certain linkages may include axes that are non-parallel and non-coaxial with joints of other linkages. According to the principles of the present disclosure, linkages may be coordinated with each other regardless of being parallel or non-parallel and regardless of being coaxial or non-coaxial. According to the principles of the present disclosure, an offset attachment member may be used to attach the flexible material 800 to a rear door of the vehicle and thereby space the attachment edge to the flexible material 800 away from a perimeter of the door and nearer to a perimeter of the vehicle.

Turning now to FIG. 1, a vehicle 100 is illustrated with a drag reducing apparatus attached to a rear end 110 of the vehicle 100, according to the principles of the present disclosure. The vehicle 100 includes a top 102 and a bottom 104. The top 102 and the bottom 104 may be the top and bottom of a body of the vehicle 100. As depicted, a drive train including tires may be positioned below the bottom 104 of the vehicle. The vehicle 100 may further extend between a right side 106 and a left side 108. As depicted, the vehicle 100 includes a door 120 at the rear end 110 of the vehicle 100. For purposes of illustration, the door 120 is a left door, and a right door is omitted from FIG. 1. The vehicle 100 may further include a right door that is substantially a mirror image of the door 120. As depicted, the aerodynamic apparatus mounts to the door 120 of the vehicle 100. Another aerodynamic apparatus that may be the mirror image of the illustrated aerodynamic drag reducing apparatus may be mounted to the right door of the vehicle 100.

Figure 5:
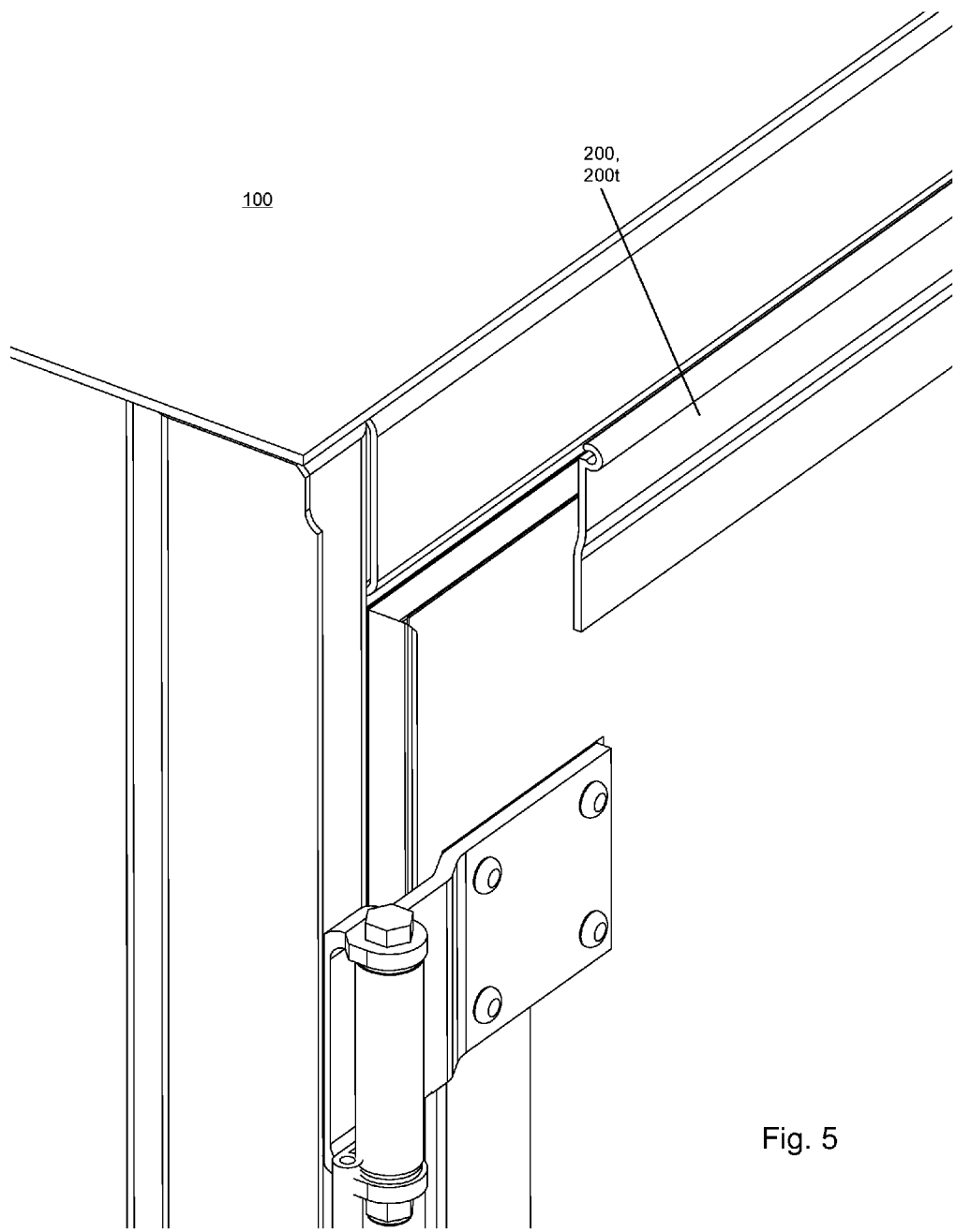
FIG. 5 is an enlarged partial perspective view of the vehicle and the aerodynamic drag reducing apparatus of FIG. 1.

As illustrated at FIG. 1, the rear end 110 of the vehicle 100 includes a door frame 140. A pair of lock rods 160 extend along the door 120 and thereby fasten the door 120 to the door frame 140 when the door 120 is at a closed configuration. As the door frame 140 occupies space between a perimeter of the door 120 and the top 102 and the sides 106, 108, attaching the flexible material 800 to the perimeter of the door would result in a step between the top 102 and the aerodynamic surfaces of the aerodynamic drag reducing apparatus. Likewise, a step would exist between respective sides 106, 108 of the vehicle and sides of the aerodynamic drag reducing apparatus. As illustrated at FIGS. 1 and 5, a fabric mount 200 may be attached to the door and thereby extend an attachment point to the flexible material 800 beyond the perimeter of the door. As illustrated, a top fabric mount 200*t* may be included to support the mounting edge of the flexible material 800 adjacent to or near to the top 102 of the vehicle 100. Likewise, a side fabric mount 200*s* may move a mounted edge of the flexible material 800 nearer to or adjacent sides 106, 108 of vehicle 100. In certain embodiments, clearance lights may exist and the fabric mount 200*t*, 200*s* may stop short of lying in the plane of the top 102 and/or the sides 106, 108 of the vehicle. The fabric mount 200 may further be used at a lower position of the aerodynamic drag reducing apparatus. In particular a bottom fabric mount 200*b* is illustrated. The fabric mount 200 may include a C-shaped structure adapted to hold a tarp to the fabric mount 200 by insertion of a compression cord (e.g., an extruded polymer, an extruded cord of rubber, etc.). As the fabric is laid in an interior of the C-shaped structure, the cord is pressed within the C-shaped structure thereby trapping the edge of the flexible material 800 along the fabric mount 200. As depicted, the fabric mount 200 is used at the door 120 of the vehicle 100 and thereby holds a forward edge of the flexible material 800 to the door. In certain embodiments, a rearward edge of the flexible material 800 may also be held by similar fabric mounts 200.

As illustrated at FIG. 1, a movable frame mount 300 extends forwardly and rearwardly between a stowed configuration adjacent to the rear end 110 of the vehicle and extended configuration spaced away from the rear end 110 of the vehicle 100. The movable frame mount 300 supports and holds a rearward edge of the flexible material of the aerodynamic drag reducing apparatus. As mentioned above, a fabric mount 200 may be attached to the movable frame mount 300 and thereby secure rear edges of the flexible material. In certain embodiments, the fabric mount 200 or similar fabric mounts 200 (e.g., including the C-shaped structure) may be incorporated into the movable frame mount 300.

The moveable frame mount 300 includes a top 302, a bottom 304, a side 306, an interior edge 308, and a radius 310 between the top 302 and the side 306 and also between the side 306 and the bottom 304 of the movable frame mount 300. In other embodiments, one or both of the radii 310 may be omitted and the top 302 and the side 306 may meet at a corner and/or the bottom 304 and the side 306 may meet at a corner.

Turning now to FIGS. 6-9, a plurality of extension linkages 400 are illustrated according to the principles of the present disclosure. As illustrated at FIG. 1, certain of the extension linkages 400 are oriented as horizontal extension linkages 400*h*. As depicted, the horizontal extension linkages 400*h* are configured to swing and operate in a horizontal plane. The horizontal extension linkages 400*h* are planar linkages in the depicted embodiments. In other embodiments, extension linkages 400 with orientations other than horizontal and nonplanar extension linkages may be used. FIG. 1 further illustrates certain extension linkages 400 configured as vertical extension linkages 400*v*. Such vertical extension linkages 400*v* swing and operate in a vertical plane and thus are planar linkages. In other embodiments, the extension linkages 400 may have orientations other than vertical and may be nonplanar linkages. As depicted, the horizontal extension linkages 400*h* are attached to the side 306 of the moveable frame mount 300. Similarly the vertical extension linkages 400*v* are attached to the bottom 304 of the moveable frame mount 300. As depicted, linkages attached to the top 302 of the moveable frame mount 300 may also be vertical extension linkages 400*v*, however orientations of the extension linkages 400*v* attached to the top 302 of the moveable frame mount 300 are inverted in relation to the vertical extension linkages 400*v* that mount to the bottom 304 of the moveable frame mount 300.

As mentioned above, a first set of extension linkages 400 are oriented to swing in a first direction normal to a first plane, and a second set of extension linkages 400 are oriented to swing with axes normal to a second plane. As the first and second planes are non-parallel, the extension linkages 400 of the first and second sets of extension linkages constrain the moveable frame mount 300 to move in a substantially linear motion that is perpendicular to the rear end 110 of the vehicle 100.

Figure 6:
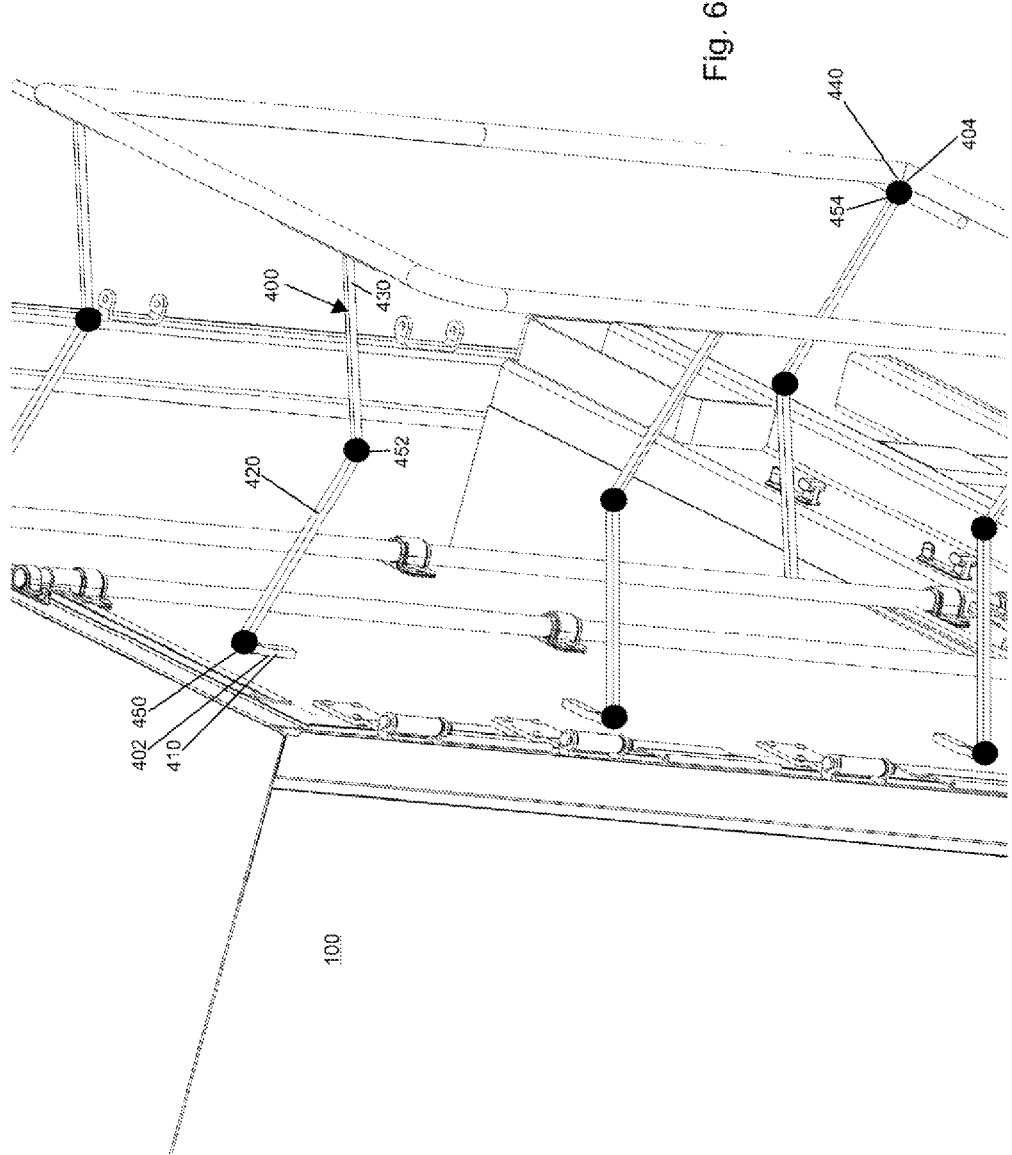
FIG. 6 is a partial semi-schematic perspective view of the vehicle and the aerodynamic drag reducing apparatus of FIG. 1.

As illustrated at FIG. 6, the extension linkages 400 each extend between a first end 402 and a second end 404. The first end 400 is depicted connected to the rear end 110 of the vehicle 100. In the depicted embodiment, the door 120 of the vehicle 100 defines a substantial portion of the rear end 110 of the vehicle 100 and the first end 402 is mounted to the door 120. The second end 404 of the extension linkages are mounted to the moveable frame mount 300. In certain embodiments, the moveable frame mount 300 is the end of the aerodynamic drag reducing apparatus. In other embodiments, a plurality of moveable frame mounts 300 are included and a second stack of extension linkages 400 are mounted to the intermediate moveable frame mount and repeated with the second moveable frame mount 300 being smaller than the first moveable frame mount 300. Such arrangements are further described in the above-referenced U.S. Patent Nos.

In the depicted embodiment, the first end 402 of the extension linkage 400 is mounted via a first mount 410. The extension linkage 400 includes a first link 420 that is rotationally mounted to the first mount 410. The extension linkage 400 further includes a second link 430 that is pivotally mounted to the first link 420. In certain embodiments, the second link 430 and the first link 420 are pivotally mounted together at a spherical joint. In other embodiments, the first and second links 420, 430 are pivotally mounted to each other via a cylindrical joint. As illustrated at FIG. 6, the extension linkage 400 may include a second mount 440 that is rotationally mounted to the second link 430. The second mount 440 connects the second link 430 to the moveable frame mount 300. The extension linkage 400 thereby includes a first joint 450 between the first mount 410 and the first link 420, a second joint 452 between the first link 420 and the second link 430, and a third joint 454 between the second link 430 and the moveable frame mount 300. In the depicted embodiment, the first joint 450 is a cylindrical joint, the second joint 452 is a spherical joint, and the third joint 454 is a cylindrical joint. In other embodiments, the first joint 450 and the second joint 452 may be cylindrical joints, and the third joint 454 may be a spherical joint. In still other embodiments, the first joint 450 may be a spherical joint, and the second joint 452 and the third joint 454 may be cylindrical joints. In still other embodiments, the first joint 450, the second joint 452, and the third joint 454 may all be cylindrical joints. In certain embodiments, the cylindrical joints may have axes that are substantially parallel to each other within the same extension linkage 400. By adding a spherical joint at one of the joints 450, 452, 454, binding may be eliminated and/or reduced within the plurality of extension linkages 400.

Figure 7:
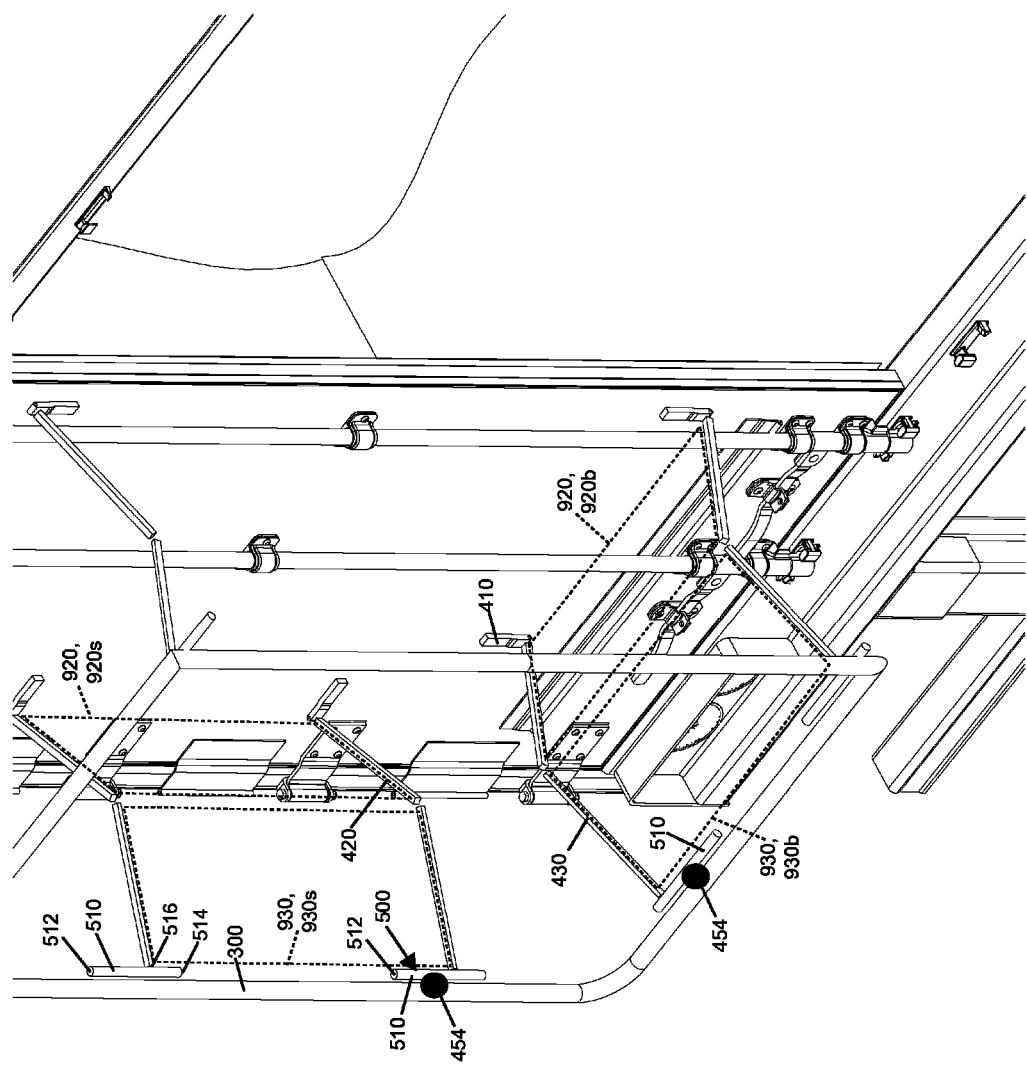
FIG. 7 is another partial semi-schematic perspective view of the vehicle and the aerodynamic drag reducing apparatus of FIG. 1.
Figure 8:
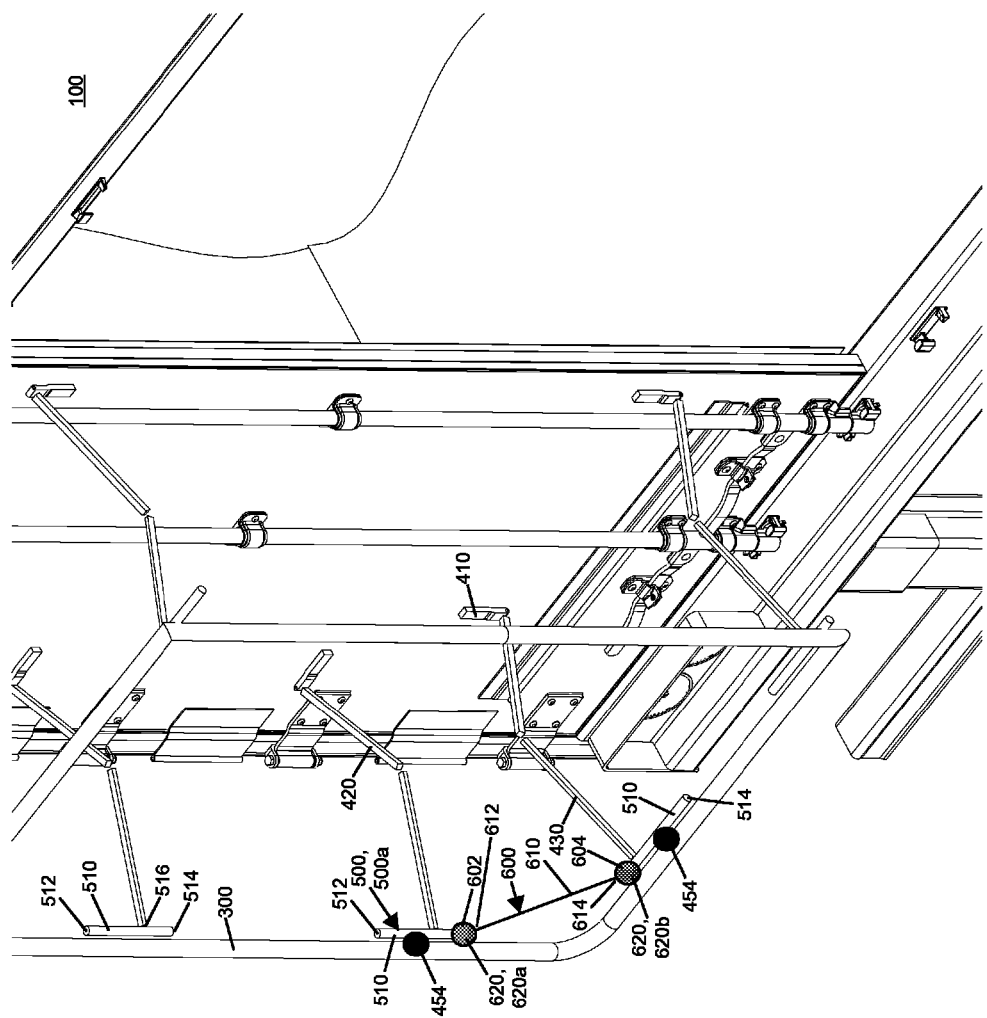
FIG. 8 is the partial semi-schematic perspective view of FIG. 7, but with a drive shaft interconnecting linkages of the aerodynamic drag reducing apparatus according to the principles of the present disclosure with the description of FIG. 8.
Figure 9:
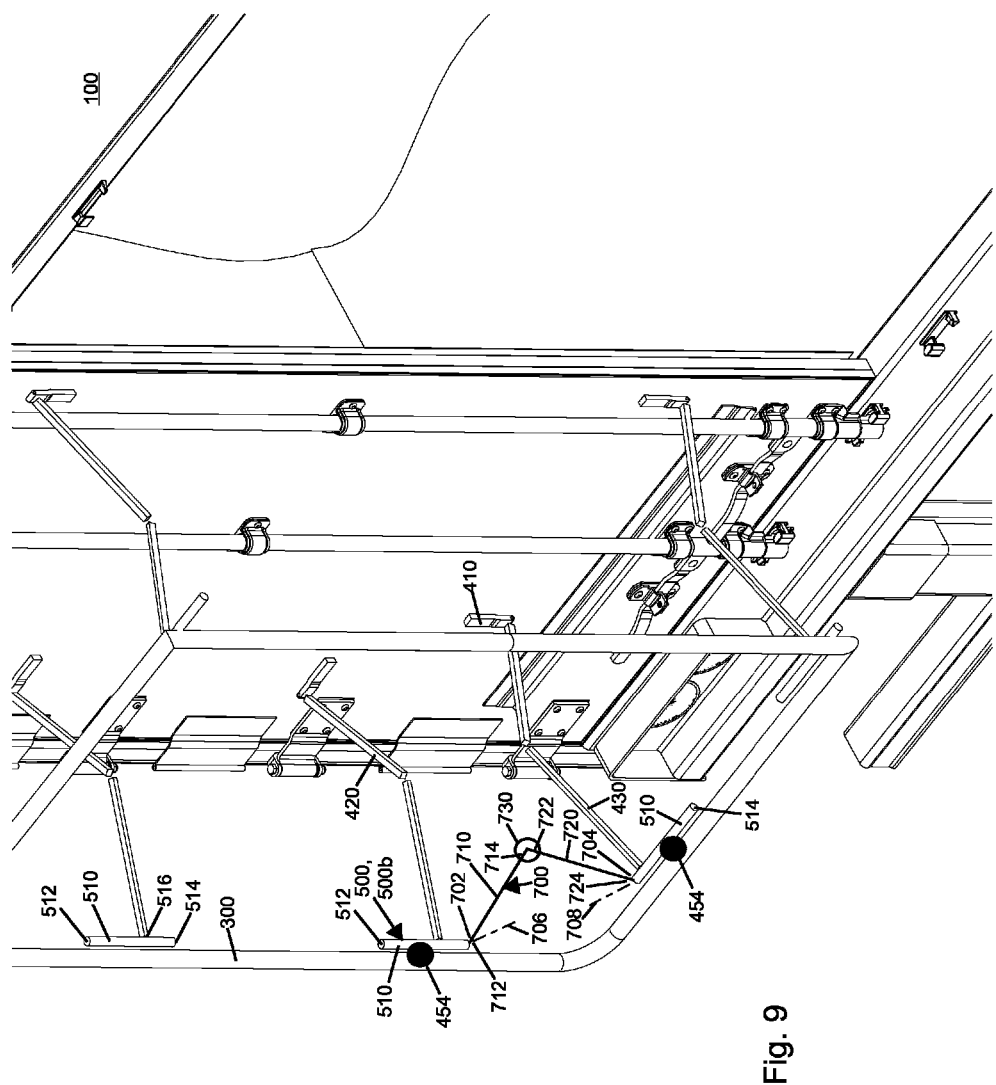
FIG. 9 is the partial semi-schematic perspective view of FIG. 7, but with a linkage interconnecting the linkages of the drag reducing apparatus, according to the principles of the present disclosure.

Turning now to FIGS. 7-9, certain example joint coordinators 500 are illustrated according to the principles of the present disclosure. The joint coordinators 500 serve to keep the plurality of extension linkages 400 coordinated as the moveable frame mount 300 is moved between the stowed configuration and the extended configuration. As depicted, the joint coordinators 500 are connected between the various second links 430 of the various extension linkages 400. In other embodiments, the joint coordinators may operate to keep the various first links 420 of the various extension linkages 400 coordinated. In still other embodiments, the joint coordinators 500 may serve to keep the first links 420 coordinated with the various other first links 420 and may also serve to keep the second links 430 coordinated with the various other second links 430. By coordinating movement of the first links 420 and/or the second links 430, the plurality of extension linkages 400 may move the moveable frame mount 300 without drooping (e.g., without substantial drooping, without excessive drooping, etc.) and/or binding (e.g., without substantial binding, without excessive binding, etc.).

As depicted, the joint coordinator 500 includes a connector 510 (e.g., a rotational connector). As depicted, the connector 510 is rotationally fixed to the orientation of a respective one of the second links 430. In certain embodiments, the connector 510 may further serve to mount the second link 430 to the moveable frame mount 300 at the third joint 454. The connector 510 may extend between a first end 512 and a second end 514. As depicted, a link connection 516 between the connector 510 and the second link 430 is positioned between the first end 512 and the second end 514. For extension linkages 400 with axes that run coincidentally with the axes of other extension linkages 400 (e.g., the extension linkages 400 connected to the side 306 of the moveable frame mount), the first end 512 of a first connector 510 may be rotationally connected to the second end 514 of a second connector 510. In certain embodiments, this connection is made via a shaft extending between the first end 512 of the first connector 510 and the second end 514 of the second connector 510.

Turning now to FIG. 8, a drive line 600 is illustrated that connects a first end 512 of a first connector 510 to a second end 514 of a second connector 510. As depicted at FIG. 8, the first and second connectors 510 connected by the drive line 600 have axes that are mutually perpendicular to each other. To accommodate a rotational connection between the connectors 510, a first end 602 of the drive line 600 includes a flex joint 620. Similarly a second end 604 of the drive line 600 includes another flex joint 620. As depicted, the flex joints 620 are included on opposite ends of a drive shaft 610. In particular, a flex joint 620a is rotationally connected to a first end 612 of the drive shaft 610, and a flex joint 620b is connected to a second end 614 of the drive shaft 610. The flex joint 620 may be a conventional U-joint. In other embodiments, the flex joint 620 may be a constant velocity joint. In still other embodiments, the flex joint 620 may be a suitable flexible cable and/or other deformable flexible joint suitable for transmitting torque across two shafts oriented at angles with each other. In yet other embodiments, the flex joint 620 may include other elements suitable for transmitting torque across two shafts, such as the linkages mentioned below. In still other embodiments, the flex joint may include various combinations of the above components. As depicted at FIG. 8, the joint coordinator 500 including flexible joints 620 is indicated by callout 500a. Turning now to FIG. 9, another joint coordinator 500b is illustrated according to the principles of the present disclosure. The joint coordinator 500b functions similarly to the joint coordinator 500a in keeping the various extension linkages 400 coordinated with each other. Callout 500 to a joint coordinator thereby refers to the joint coordinator 500a, 500b, and/or other joint coordinators adapted to keep the various extension linkages 400 coordinated. Rather than using a drive shaft and flexible joints, the joint coordinator 500b uses a connecting linkage 700. The connecting linkage 700 includes a first end 702 and a second end 704. The first end 702 may be attached to the second end 514 about a first axes 706. The first axes 706 may be substantially perpendicular to a longitudinal axis of the connector 510 to which it corresponds. As illustrated at FIG. 7, a plane 730, 730s may include the rotational axes of the corresponding second link 430. The first axes may be substantially perpendicular to the planes 930, 930s. A link 710 of the connecting linkage 700 may also be rotatably connected at the first axes 706 and hereby form a connection to the corresponding connector 510. The link 710 thereby is generally positioned within the plane 930, 930s along with the corresponding second link 430. Likewise, a second axis 708 is substantially perpendicular to a plane 930, 930b that contains the rotational axes of the second link 430 connected to the bottom 304 of the moveable frame mount 300. A link 720 may also be connected at the second axes 708 and thereby swing within the plane 930, 930b. The first link 710 includes a first end 712 mounted to the second end 514 of the corresponding connector 510 at the first axes, as depicted. Likewise, a second end 724 of the link 720 is rotationally connected to a corresponding connector 510 about the second axis 708, as depicted. The link 710 is connected at a second end 714 to the first end 722 of the link 720. As depicted, the second end 714 and the first end 722 are connected at a joint 730. In the depicted embodiment, the joint 730 is a ball joint (e.g., a spherical joint). In other embodiments, the joint 730 may be a cylindrical joint.

The connecting linkage 700 thereby transmits torque and/or position between the connectors 510 associated with the various extension linkages 400.

In embodiments where the joint coordinators operate on the first links 420, similar linkages may lay along planes of links 920, 920s, 920v and thereby connect the first links 420 and coordinate the extension linkages 400.

Figure 2:
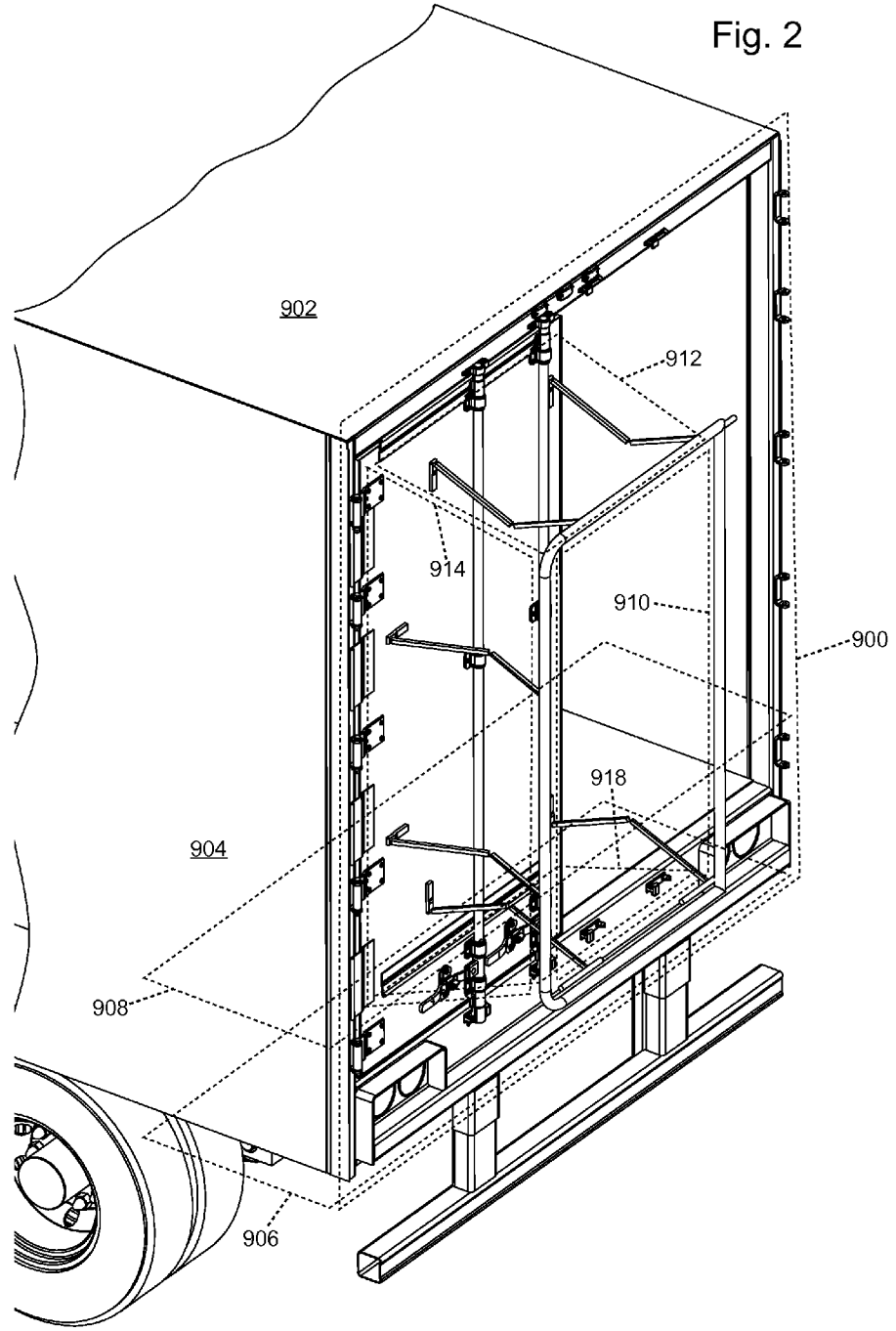
FIG. 2 is another partial semi-schematic perspective view of the vehicle and the aerodynamic drag reducing apparatus of FIG. 2.
Figure 3:
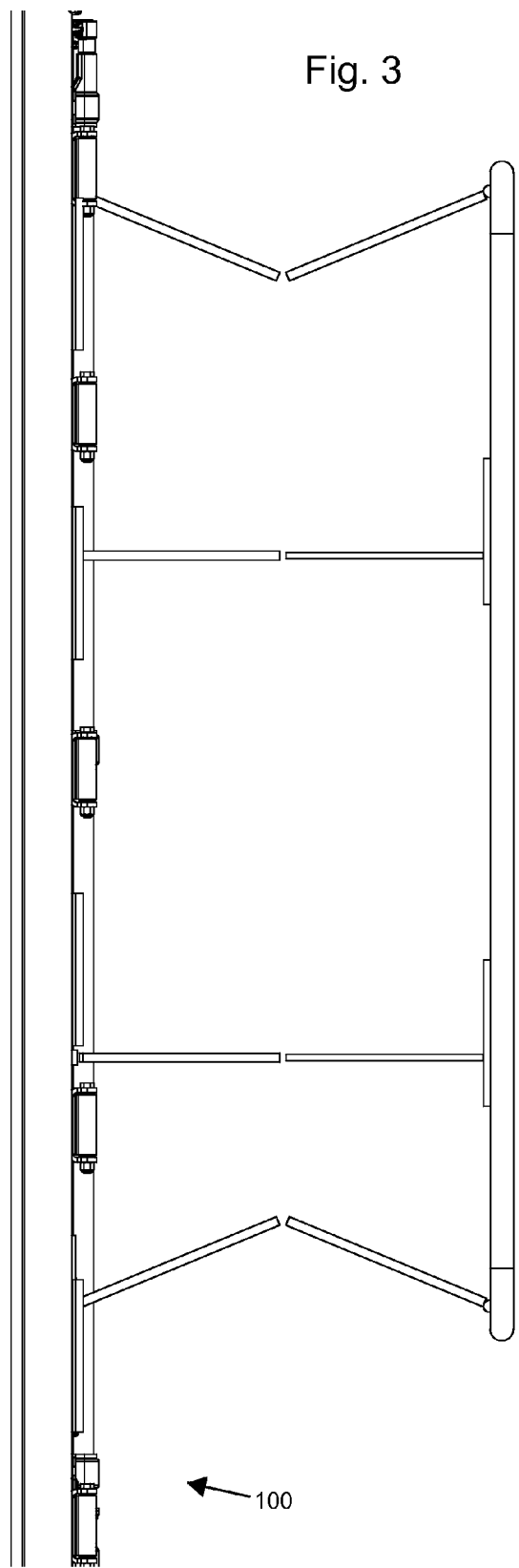
FIG. 3 is a partial semi-schematic side elevation view of the vehicle and the aerodynamic drag reducing apparatus of FIG. 1.
Figure 4:
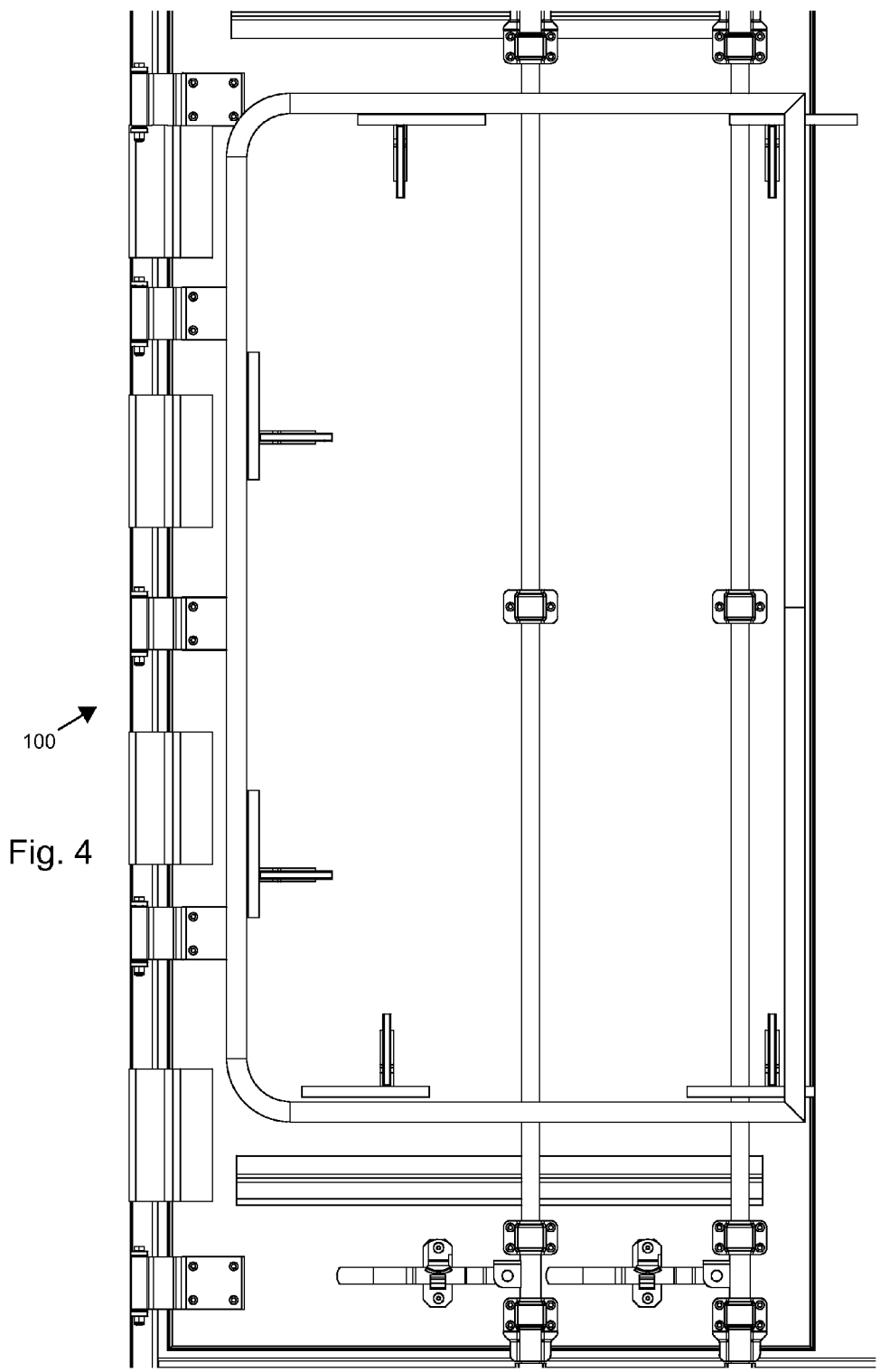
FIG. 4 is a partial semi-schematic rear elevation view of the vehicle and the aerodynamic drag reducing apparatus of FIG. 1.

Turning now to FIG. 2, various planes defined by the vehicle 100 and the drag reducing apparatus will be defined and discussed. A plane 900 may substantially define a rear end of the vehicle 100. A plane 902 may substantially define a top of the vehicle 100. A plane 904 may substantially define a side of the vehicle 100. A plane 906 may substantially define a bottom of vehicle 100 and/or a bottom of a cargo holding body of the vehicle 100. A plane 906 may be substantially parallel to the plane 908 but extend above latches used to operate and lock the lock rods 160 of the door 120. It may be desired to position the lower area of the drag reducing apparatus above the plane 908. The drag reducing apparatus may define a rear plane 910 that is substantially parallel to the plane 900. As depicted, the moveable frame mount 300 substantially defines the rear plane 910. The aerodynamic drag reducing apparatus may further define a top sloping plane 910 that corresponds with the plane 902 of the vehicle 100. The top sloping plane may intersect the plane 902 at the plane 900, or an offset may be formed to allow for clearance lights along the door frame 140 above the top of the perimeter of the door 120. The aerodynamic drag reducing apparatus may define a side sloping plane 914 that corresponds with the side plane 904 of the vehicle. The side sloping plane 914 may intersect the plane 904 at the plane 900. In other embodiments, an offset may be included in the drag reducing apparatus and thereby create a step between the side 904 of the vehicle and the side 914 of the drag reducing apparatus. As illustrated at FIG. 2 a plane 918 may be defined by the drag reducing apparatus that is positioned above the plane 908. In certain embodiments, the plane 918 may be a bottom sloping plane. In other embodiments, the plane 918 may be substantially horizontal.

In the depicted embodiments, the drag reducing apparatus and the moveable frame mount 300 may define a "C" shape that defines active surfaces of the aerodynamic drag reducing apparatus. In other embodiments, the aerodynamic drag reducing apparatus and the moveable frame mount 300 may define an upsidedown "L" shape by omitting the bottom 304 of the moveable frame mount 300. In still other embodiments, the aerodynamic drag reducing apparatus and the moveable frame mount 300 may define a "F" shape that defines active surfaces of the aerodynamic drag reducing apparatus. In such an embodiment, the "C" may be extended at the side 306 and thereby form a side that may extend lower than the plane 908 or even lower than the plane 906.

What is claimed is:

1. An aerodynamic drag reducing device for reducing drag on a vehicle, the aerodynamic drag reducing device comprising:
   a moveable frame;
   a set of linkages supporting the moveable frame in an extended configuration and a retracted configuration, a first linkage of the set of linkages defining a first axis and a second linkage of the set of linkages defining a second axis; and
   a linkage coordinator including a multi-link connecting linkage that coordinates movement between the first linkage about the first axis and the second linkage about the second axis;
   wherein the first and second axes are non-parallel; and
   wherein the multi-link connecting linkage includes a first end and a second end and wherein the first end is attached to the first linkage at a first connection and the second end is attached to the second linkage at a second connection.

2. The aerodynamic drag reducing device of claim 1, wherein the first axis extends substantially horizontally and the second axis extends substantially vertically.

3. The aerodynamic drag reducing device of claim 1, wherein the first connection is rotatable about a third axis that is substantially perpendicular to the first axis.

4. The aerodynamic drag reducing device of claim 3, wherein the second connection is rotatable about a fourth axis that is substantially perpendicular to the second axis.

5. The aerodynamic drag reducing device of claim 4, wherein the multi-link connecting linkage is a two-link connecting linkage that includes a first link and a second link and wherein the first link and the second link are connected to each other at a joint.

6. The aerodynamic drag reducing device of claim 5, wherein the joint is a cylindrical joint.

7. The aerodynamic drag reducing device of claim 5, wherein the joint is a spherical joint.

8. A method of coordinating a set of support linkages deploying an aerodynamic drag reducing device on a vehicle, the method comprising:
   providing the aerodynamic drag reducing device;
   at least partially supporting the aerodynamic drag reducing device with the set of support linkages, the set of support linkages including a first linkage and a second linkage;
   providing a multi-link connecting linkage connected between the first linkage and the second linkage; and
   transmitting a torque between the first linkage and the second linkage with the multi-link connecting linkage;
   wherein the transmitting of the torque between the first linkage and the second linkage at least partially prevents the set of support linkages from drooping.

9. The method of claim 8, further comprising at least partially supporting a moveable frame of the aerodynamic drag reducing device with the set of support linkages.

10. The method of claim 8, further comprising pivoting a first link of the first linkage about a first axis and pivoting a second link of the second linkage about a second axis when deploying the aerodynamic drag reducing device, wherein the first and second axes are non-parallel.

11. The method of claim 10, wherein the torque transmitted between the first linkage and the second linkage acts about the first axis on the first link and acts about the second axis on the second link.

12. The method of claim 8, wherein the multi-link connecting linkage is a two-link connecting linkage that includes a first link and a second link and wherein the first link and the second link are connected to each other at a joint.

13. A method of coordinating a set of support linkages deploying an aerodynamic drag reducing device on a vehicle, the method comprising:
   providing the aerodynamic drag reducing device;
   at least partially supporting the aerodynamic drag reducing device with the set of support linkages, the set of support linkages including a first linkage and a second linkage;
   providing a multi-link connecting linkage connected between the first linkage and the second linkage; and
   transmitting a torque between the first linkage and the second linkage with the multi-link connecting linkage;
   wherein the multi-link connecting linkage is a two-link connecting linkage that includes a first link and a second link and wherein the first link and the second link are connected to each other at a joint.

14. The method of claim 13, wherein the transmitting of the torque between the first linkage and the second linkage at least partially prevents the set of support linkages from drooping.

15. The method of claim 13, further comprising at least partially supporting a moveable frame of the aerodynamic drag reducing device with the set of support linkages.

16. The method of claim 13, further comprising pivoting a first link of the first linkage about a first axis and pivoting a second link of the second linkage about a second axis when deploying the aerodynamic drag reducing device, wherein the first and second axes are non-parallel.

17. The method of claim 16, wherein the torque transmitted between the first linkage and the second linkage acts about the first axis on the first link and acts about the second axis on the second link.

\* \* \* \* \*